June 8, 1926.
E. V. LAWRENCE
TRAILER
Filed April 24, 1920  3 Sheets-Sheet 1
1,588,036
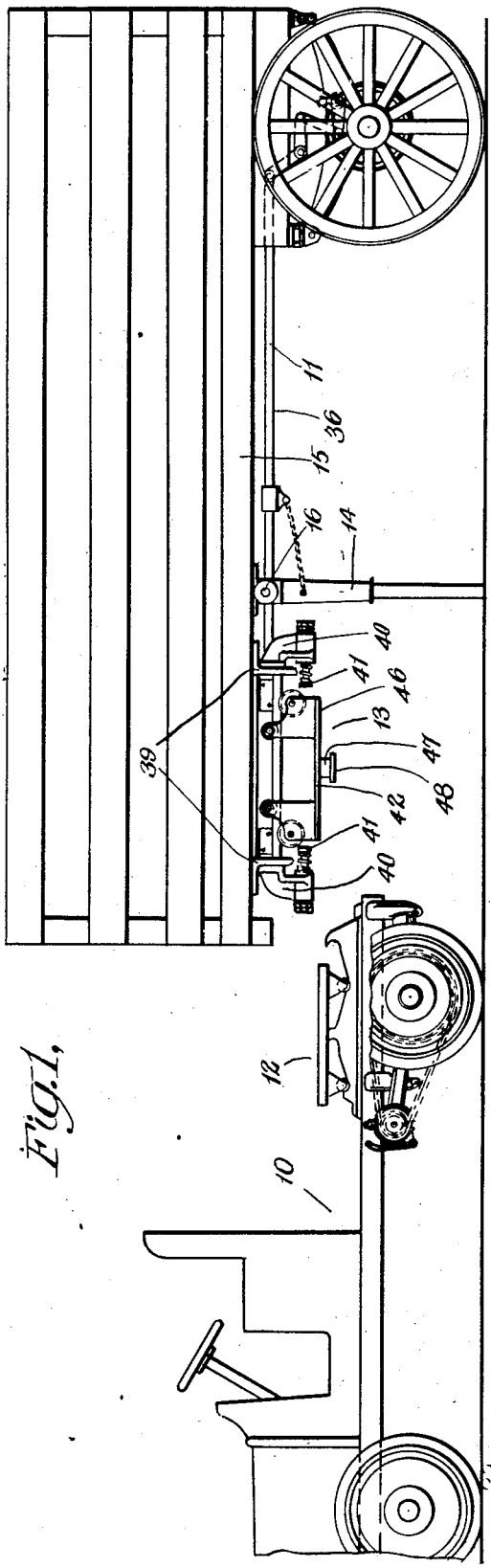
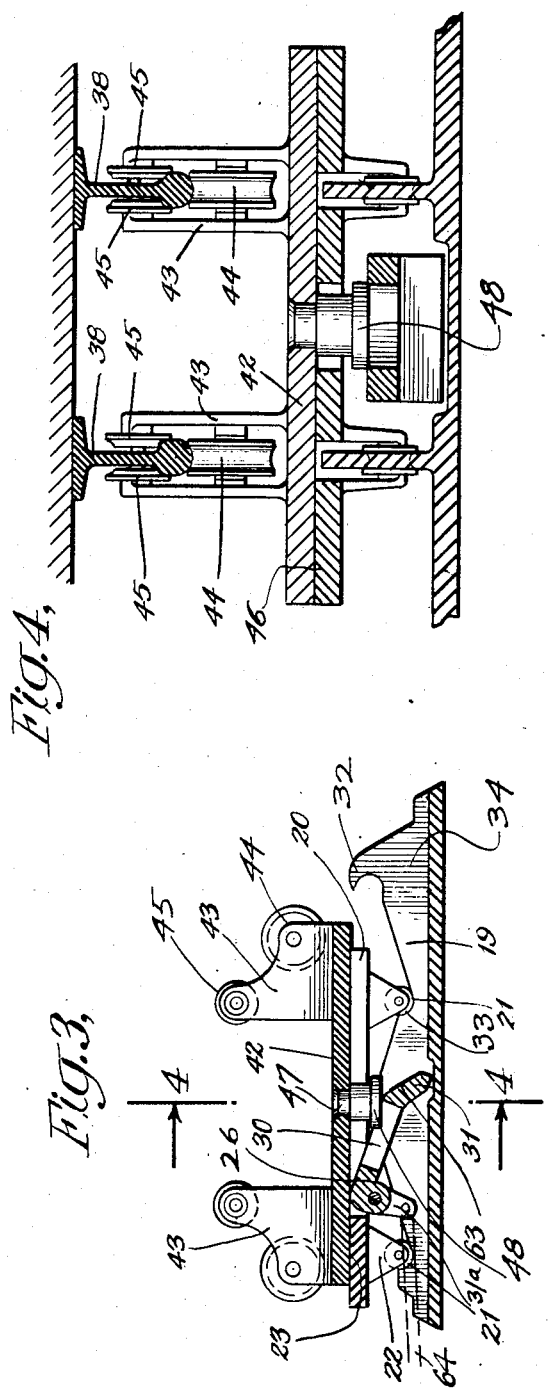
Inventor
Edward V. Lawrence
By his Attorney

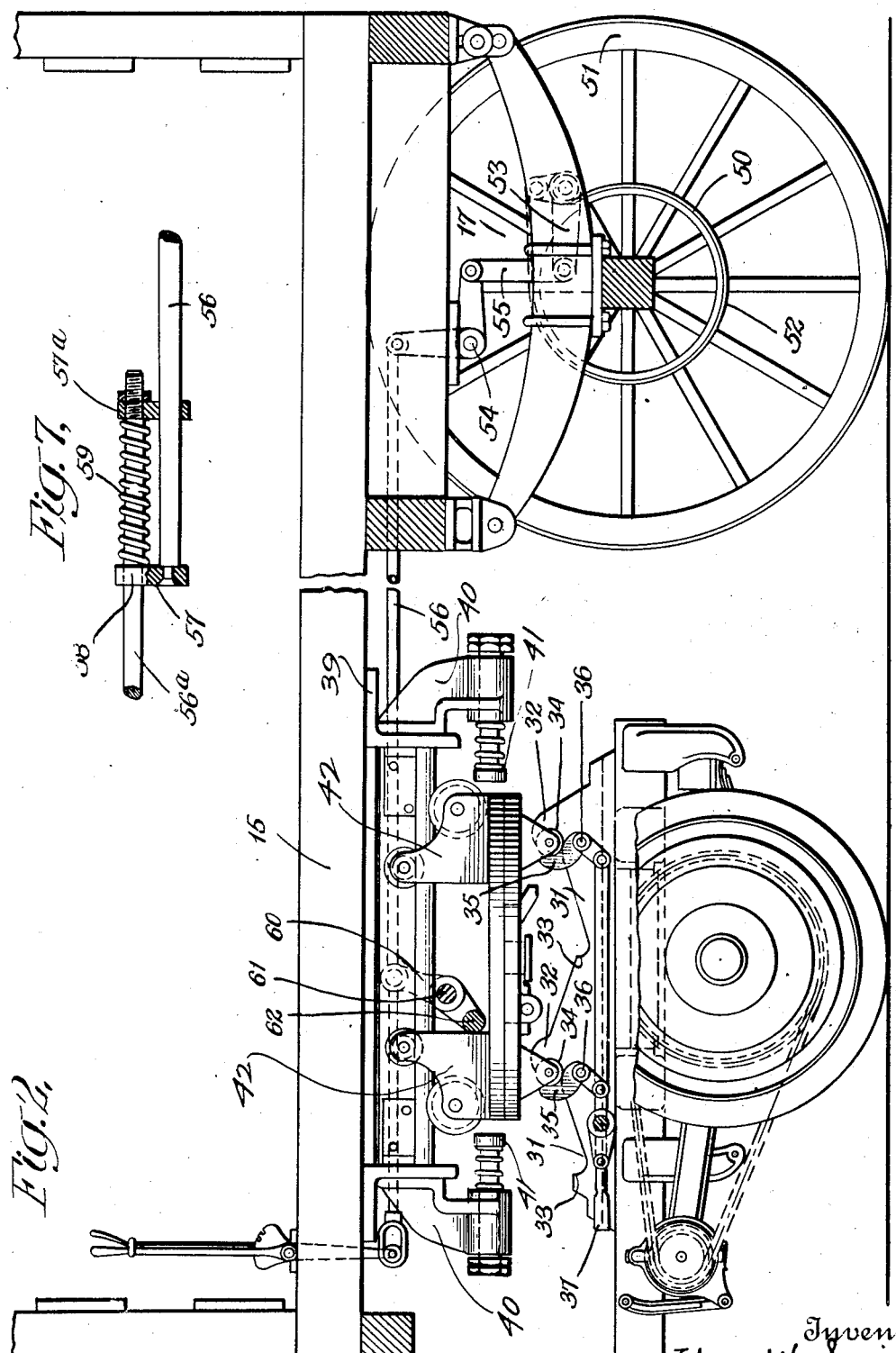

June 8, 1926.
E. V. LAWRENCE
1,588,036
TRAILER
Filed April 24, 1920   3 Sheets-Sheet 3
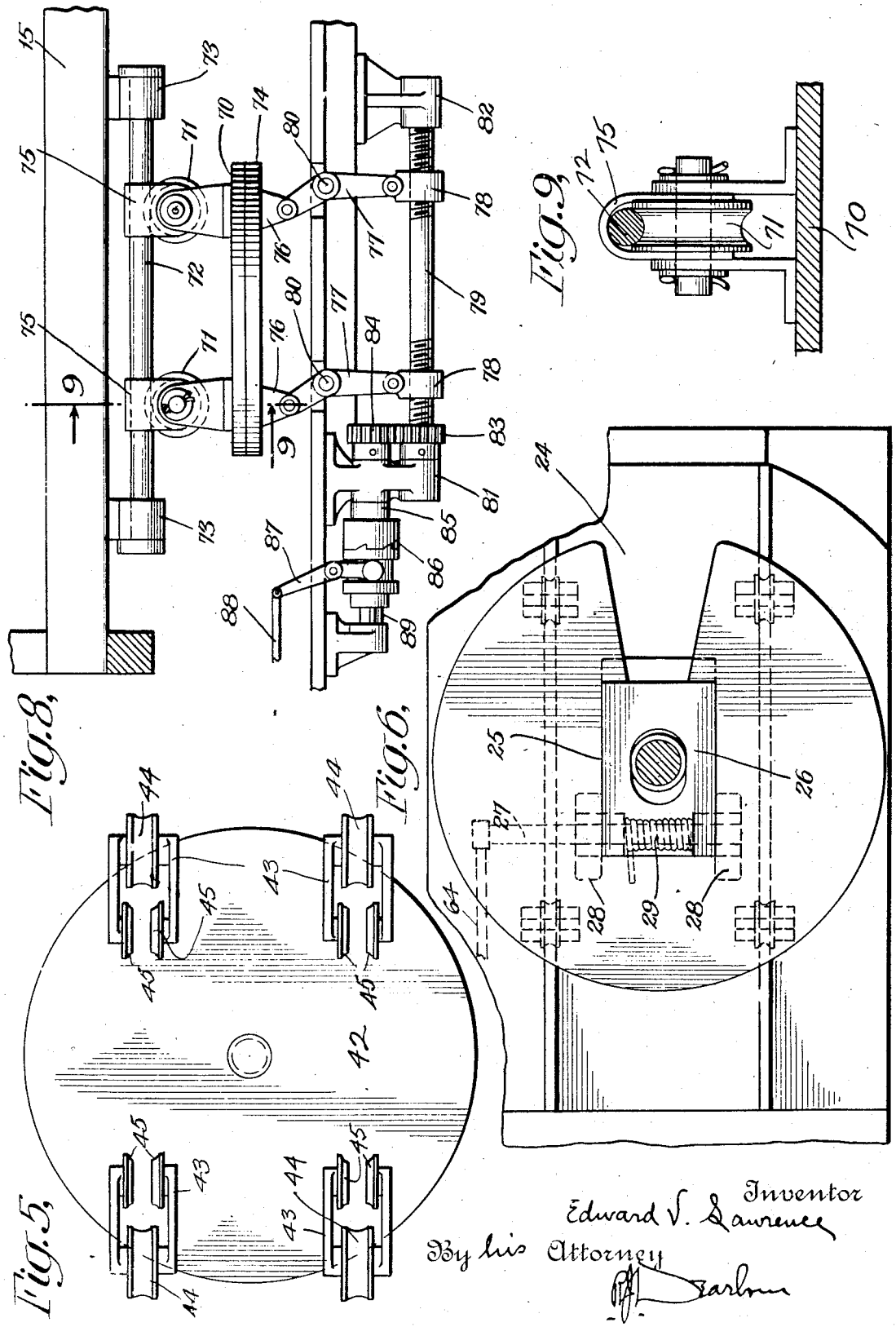

Patented June 8, 1926.

1,588,036

UNITED STATES PATENT OFFICE.

EDWARD V. LAWRENCE, OF ENGLEWOOD, NEW JERSEY, ASSIGNOR TO E. V. LAWRENCE SAFETY BRAKE COMPANY, INC., A CORPORATION OF NEW YORK.

TRAILER.

Application filed April 24, 1920. Serial No. 376,218.

My invention relates to trailers and has special reference to so-called semi-trailers or two-wheel trailers which are adapted to overhang the rear end of the tractor, to which they are coupled by a fifth-wheel structure.

One object of my invention is to provide a simple and durable fifth-wheel structure that shall be arranged in such manner as to be readily coupled and uncoupled to and from the trailers, by means of the tractor power, as desired.

Another object of my invention is to provide an elevating fifth-wheel structure which shall avoid the necessity of jacking up the forward end of the semi-trailer either in coupling to the truck or disconnecting therefrom.

I am aware that fifth-wheel structures for the same general purpose have been proposed hitherto but they have usually been so arranged and constructed as to necessitate the jacking of the trailer to a greater or less degree for the purpose of disconnecting the truck from the trailer.

The elevating fifth-wheel of my invention fundamentally differs from any of the structures of the prior art, in that the lower half of the fifth-wheel which forms a part of the tractor, comprises an adjustable member which is adapted to be raised and lowered, the arrangement being such that the notched front of the lower fifth-wheel portion allows part of the latter to clear the said bolt while another part abuts the king bolt of the trailer and allow the tractor to be backed directly under the trailer.

When in position the power of the tractor is utilized for elevating the movable member of the lower half of the fifth-wheel, thus bringing it into locking engagement with the king bolt of the trailer. Furthermore, the aforesaid movable member of the fifth-wheel acts like a jack and positively lifts the front end of the trailer so as to release the usual legs or supports which hold the trailer body in a substantially horizontal loading position.

The cooperating movable and fixed members of the lower half are locked in the elevated position as hereinafter explained more in detail, until it is desired to disconnect the tractor from the trailer. In that event, the supporting legs are lowered into place and the movable member of the fifth-wheel lowered.

In order that my invention may be thoroughly understood, I will now describe the same in the following specification, and will then point out the novel features thereof in appended claims.

Referring to the drawings:

Figure 1 is an elevation of a trailer in loading position, together with a tractor in position to be backed under the front end of the trailer, the cooperating upper and lower fifth-wheel halves being clearly illustrated.

Figure 2 is an elevation of the same trailer, drawn to a larger scale, with the rear end of the truck shown in cooperative relation therewith, the fifth-wheel halves having been brought into engagement by backing the tractor into place and elevating the movable member of the lower half of the fifth-wheel.

Figure 3 is a sectional elevation showing the cooperating fifth-wheel halves in detail, including the latch which, under normal operating conditions, fastens the parts in suitable relation.

Figure 4 is a sectional elevation, taken on the line 4—4 of Figure 3.

Figure 5 is a plan view of the movable member of the upper half of the fifth wheel.

Figure 6 is a plan view of the lower half of the fifth-wheel.

Figure 7 is a detail view of an auxiliary spring which is preferably introduced into the brake actuating rod to avoid the possibility of strain.

Figure 8 is an elevation showing a modified fifth-wheel structure which also constitutes an embodiment of my invention.

Figure 9 is a sectional elevation on the line 9—9 of Figure 8.

In the drawings, 10 designates a tractor of any suitable type and 11 designates a trailer or semi-trailer of the two-wheel type, the tractor 10 having a fifth-wheel lower half 12 which is arranged and adapted to cooperate with the fifth-wheel upper half 13 on the trailer. The trailer is provided with legs or supports 14 which are pivoted to the trailer body 15 at 16 so that they are adapted to be swung under the body when not in use. When the trailer is standing idle or is being loaded or unloaded, with the tractor disconnected, the legs occupy the position shown in Figure 1.

As shown in Figure 2 the trailer is equipped with a brake mechanism designated 17.

The vehicle structures illustrated will now be considered more in detail.

Fifth-wheel lower half.

The lower half of the fifth wheel which is designated 12 and is mounted on the tractor at the rear, consists of a base plate having a pair of longitudinally extending substantially parallel cam rails 19, and a movable elevating member 20 having bearing rollers 21 mounted on lugs 22 and arranged in pairs to cooperate with the cam rails 19 of the base plate.

The movable member 20, has the general form of a disc, with the fifth-wheel bearing surface 23 at the top and a notch or cut away sector 24 at the back. Furthermore, it is cut away at the center to form a recess 25 in which a latch plate 26 is arranged. This plate is pivoted on a transverse pin 27 supported in bearing lugs 28 and is normally held substantially flush with the bearing surface 23 by the action of a spring 29. It has a central opening or tongue groove 30 and has a downwardly extending projection or cam lug 31ª at the rear.

The cam rails 19 are similar to each other and each of them is formed, as clearly shown in Figure 2, to comprise a pair of inclined cam surfaces 31 on which the rollers 21 ride. There is a hook-shaped stop projection 32 at the rear which is also the high end of the cam surface. There is also a stop 33 at the bottom of each cam surface. At the top of each incline there is a slight depression 34 into which the rollers drop under normal working conditions as shown in Figure 2. Furthermore, the locking or latching levers 35 are pivoted at 36 and are adapted to be swung into position to hold the movable member 20 in its elevated position, by means of a handle 37.

Fifth-wheel upper half.

The upper half 13 of the fifth-wheel is attached to the trailer near the front and is adapted to cooperate with the lower half 12 on the tractor. It comprises a pair of spaced rails 38 which are secured to the under side of the trailer body 15 between a pair of transverse bars 39, two pair of downwardly extending brackets 40 which support spring-pressed stops 41, and a movable member 42.

The member 42 (see Fig. 5) has two pair of roller brackets 43 extending upwardly and supporting grooved pressure rollers 44 which engage the bottom surfaces of the rails 38 and hanger rollers or pulleys 45 which engage the flange of the rail and serve to suspend the movable member 42 when the trailer is detached. The arrangement is such that the heavier rollers 44 take the weight of the trailer by pressing on the rails 38 while the hanger rollers hold the movable member in place and prevent it from being dissociated with the trailer when the truck is removed.

The member 42 is movable longitudinally of the vehicle on the rails 38, to an extent which is limited by the spring-pressed stops 41, and these stops, at least one pair of them, as shown in Figure 2, are preferably made adjustable so that the extent of the lost motion may be varied as desired for the purpose of accommodating the brake mechanism as hereinafter explained. The movable member 42 has a fifth-wheel bearing surface 46 which cooperates with the surface 23 of the member 20, and it has a downwardly extending king bolt projection 47 with an enlargement or head 48.

Brake mechanism.

The brake mechanism 17 comprises brake drums 50 attached to the trailer wheels 51 as shown in Figure 2, and cooperating brake bands 52 which are set by brake actuating levers 53. The brake mechanism further comprises a pair of bell crank levers 54 connected to the brake actuating lever 53 by links 55 and one or more brake actuating rods 56 which may include auxiliary springs as shown in Figure 7. This arrangement consists of a lug 57 secured to the rod 56 at one end and perforated at 58, to form a guide bearing for another section of the same rod which may be designated 56ª and which is provided with a lug 57ª corresponding to the lug 57. One of the lugs however, is preferably adjustable in its position relative to the rod on which it is mounted in order to adjust the tension of a spring 59 which is interposed between the lugs on the rod section 56ª and introduces a resilient element into the rod.

The rods 56 are secured at the front end of the trailer to bell crank levers 60 which are pivoted on a cross rod 61 affixed to the vehicle body 15 and are joined by a tie rod 62 at the opposite ends of the levers. The cross tie 62 extends between the brackets 42 and is arranged with reference thereto so as to be actuated thereby when the lost motion in the fifth-wheel is taken up by the pushing of the trailer on the tractor due to the tendency for the trailer load to overhaul the tractor in going down hill or when the usual tractor brakes are applied.

Operation.

Before discussing the modified structure the operation of the arrangement shown in Figures 1 to 7 inclusive will be described.

Assuming that the trailer occupies the position shown in Figure 1 and that the load has been either placed upon it or removed from it, if it is desired to couple the tractor, the tractor is backed under the fifth-wheel of the trailer, the movable member of the lower half of the fifth-wheel being in the lowered or depressed position as shown in Figure 1, in which the rollers 21 rest against the stops 33. In this position the fifth-wheel bearing surface 23 of the lower half is low enough to pass freely under the cooperating fifth-wheel bearing surface 46 and the parts are guided together by the wedge shaped sector opening 24 which comes into engagement with the king pin projection 47.

As the tractor is backed into position the king pin projection first engages a cam surface 63 on the lug 31 and depresses the latch plate 26 in opposition to the spring 29. The king pin projection 47 then enters the central opening. The latch plate snaps into position and locks the parts together when they are in full cooperation. It is now only necessary for the driver of the tractor to pull forward in order that the fifth-wheel member shall be elevated by the riding of the rollers 21 on the inclined surfaces 31 of the cam rail 19. The elevation of the trailer thus accomplished is sufficient to free the legs 14 which may be provided with springs for automatically swinging them against the body.

When the destination of the trailer has been reached or when it is desired to disconnect the tractor from the trailer for any cause, the driver releases the latch plate 26 by means of the pull rod or cable 64 which is suitably connected to a hand lever and operated from the cab, thus actuating the latch plate 26 and releasing the handle 37 so as to permit the movable member 20 of the lower half of the fifth-wheel to drop back into the position shown in Figures 1 and 3.

Referring to Figures 8 and 9, the modification here shown comprises an upper fifth-wheel section 70 which is provided with bearing rollers 71 cooperating with a bar or rail 72 which is supported in bearing brackets 73, as clearly shown in Figure 8. The upper fifth-wheel section is prevented from dropping when the cooperating lower fifth-wheel section 74 is separated from it, by means of straps 75 which extend over the bar 72. The trailer body is designated 15 and corresponds to that shown in Figure 1.

The lower fifth-wheel section 74 has downwardly extending lugs 76 which are pivotally connected to bell crank levers 77 at their upper ends. The lower ends of these bell crank levers are formed to provide nuts 78 through which a jack screw 79 extends. The bell crank levers 77 are pivotally mounted at 80 on the tractor and the jack screw 79 is rotatively supported in bearings 81 and 82 and has a gear wheel 83 which meshes with the gear wheel 84 on a clutch shaft 85. A clutch 86 governed by an actuating lever 87 and pull bar 88, is adapted to throw the gear 84 into driving connection with the driving shaft 89 of the vehicle. When the clutch is set the screw 79 is turned and the nuts 78 travel in one direction or the other depending on the driver of the tractor who can use his gear shift and reverse to govern the direction and speed at which the screw is turned.

When the nuts are in the position shown in Figure 8, the lower fifth-wheel section 74 is elevated and if it is desired to detach the trailer from the tractor, it is only necessary to swing down the supporting legs 14 or put some other support under the body and then turn the screw 79 so as to lower the fifth-wheel section detaching it from the king bolt projection which is formed as in the previous figures.

I have not shown either the slot in the lower fifth-wheel section of the king bolt projection or the upper fifth-wheel section in this modification, because these parts may be identical with those shown in Figures 1 to 7.

Various other modifications will suggest themselves to those skilled in this art, and I intend that only such limitations be imposed as are indicated in the appended claims.

What I claim is:

1. The combination with a trailer having an upper fifth-wheel section, of a tractor having a lower fifth-wheel section comprising a movable member adapted to cooperate with the upper fifth-wheel section, and means dependent upon the tractive power of the tractor for elevating the movable member of said tractor to pick up the trailer.

2. The combination with a trailer having an upper fifth-wheel section, of a tractor having a lower fifth-wheel section comprising a movable member adapted to cooperate with the upper fifth-wheel section, and cam supports for elevating said movable member to pick up the trailer.

3. The combination with a trailer having an upper fifth-wheel section, of a tractor having a lower fifth-wheel section comprising a movable member adapted to cooperate with the upper fifth-wheel section, means dependent upon the tractive power of the tractor for elevating said movable member to pick up the trailer, and releasable means for locking the movable member in its elevated position.

4. The combination with a trailer having an upper fifth-wheel section, of a tractor having a lower fifth-wheel section comprising a movable member adapted to cooperate with the upper fifth-wheel section, cam supports for elevating said movable member to pick up the trailer, and a latch for holding the movable member in an elevated position on the cam supports.

5. The combination with a trailer having an upper fifth-wheel section comprising a bearing plate with a downwardly extending king pin projection, of a tractor having a lower fifth-wheel section comprising a movable member having a recess and a latch plate to receive the king pin, and means dependent upon the tractive power of the tractor for elevating said movable member to pick up the trailer.

6. The combination with a trailer having an upper fifth-wheel section comprising a bearing plate with a downwardly extending king pin projection, of a tractor having a lower fifth-wheel section comprising a movable member having a recess and a latch plate to receive the king pin, and cam supports for elevating said movable member to pick up the trailer.

7. The combination with a trailer having an upper fifth-wheel section comprising a bearing plate with a downwardly extending king pin projection, of a tractor having a lower fifth-wheel section comprising a movable member having a recess and a latch plate to receive the king pin, means dependent upon the tractive power of the tractor for elevating said movable member to pick up the trailer, and releasable means for locking the movable member in its elevated position.

8. The combination with a trailer having an upper fifth-wheel section comprising a bearing plate with a downwardly extending king pin projection, of a tractor having a lower fifth-wheel section comprising a movable member having a recess and a latch plate to receive the king pin, cam supports for elevating said movable member to pick up the trailer, and a latch for holding the movable member in an elevated position on the cam supports.

9. The combination with a trailer having an upper fifth-wheel section comprising a longitudinally movable member connected thereto by a lost motion connection and having a downwardly extending king pin projection, of a tractor having a lower fifth-wheel section comprising a movable member having a recess and a latch plate to receive the king pin, and means dependent upon the tractive power of the tractor for elevating said movable member to pick up the trailer.

10. The combination with a trailer having an upper fifth-wheel section comprising a longitudinally movable member connected thereto by a lost motion connection and having a downwardly extending king pin projection, of a tractor having a lower fifth-wheel section comprising a movable member having a recess and a latch plate to receive the king pin, and cam supports for elevating said movable member to pick up the trailer.

11. The combination with a trailer having an upper fifth-wheel section comprising a longitudinally movable member connected thereto by a lost motion connection and having a downwardly extending king pin projection, of a tractor having a lower fifth-wheel section comprising a movable member having a recess and a latch plate to receive the king pin, means dependent upon the tractive power of the tractor for elevating said movable member to pick up the trailer, and releasable means for locking the movable member in its elevated position.

12. The combination with a trailer having an upper fifth-wheel section comprising a longitudinally movable member connected thereto by a lost motion connection and having a downwardly extending king pin projection, of a tractor having a lower fifth-wheel section comprising a movable member having a recess and a latch plate to receive the king pin, cam supports for elevating said movable member to pick up the trailer, and a latch for holding the movable member in an elevated position on the cam supports.

In witness whereof, I have hereunto set my hand this 28 day of Feb., 1920.

E. V. LAWRENCE.